(12) United States Patent
Chen et al.

(10) Patent No.: US 9,344,121 B2
(45) Date of Patent: May 17, 2016

(54) RADIO COMMUNICATION TRANSMISSION SYSTEM AND METHOD BASED ON SOFTWARE DEFINED RADIO

(75) Inventors: Ning Chen, Shenzhen (CN); Bingxin Tian, Shenzhen (CN)

(73) Assignees: ZTE Corporation, Shenzhen, Guangdong (CN); ZTE Microelectronics Technology Co., Ltd., Shenzhen (CN)

( * ) Notice: Subject to any disclaimer, the term of this patent is extended or adjusted under 35 U.S.C. 154(b) by 249 days.

(21) Appl. No.: 14/005,437

(22) PCT Filed: May 31, 2011

(86) PCT No.: PCT/CN2011/075015
§ 371 (c)(1),
(2), (4) Date: Oct. 14, 2013

(87) PCT Pub. No.: WO2012/122742
PCT Pub. Date: Sep. 20, 2012

(65) Prior Publication Data
US 2014/0057577 A1    Feb. 27, 2014

(30) Foreign Application Priority Data
Mar. 17, 2011    (CN) .......................... 2011 1 0065351

(51) Int. Cl.
*H04B 1/00*    (2006.01)

(52) U.S. Cl.
CPC ............ *H04B 1/0003* (2013.01); *H04B 1/0007* (2013.01)

(58) Field of Classification Search
CPC ............ H04B 1/40; H04B 1/38; H04B 1/401; H04B 1/0003; H04B 1/0007; H01Q 21/28
See application file for complete search history.

(56) References Cited

U.S. PATENT DOCUMENTS 7,272,413 B2    9/2007  Yu
7,519,743 B2 *  4/2009  Yen ..................... G06F 13/4068
                                                710/14

(Continued)

FOREIGN PATENT DOCUMENTS

CN          1606375 A       4/2005
CN        101945490 A       1/2011
WO       2011041111 A2       4/2011

OTHER PUBLICATIONS

International Search Report in international application No. PCT/CN2011/075015, mailed on Dec. 22, 2011.

(Continued)

*Primary Examiner* — Nay A Maung
*Assistant Examiner* — Maryam Soltanzadeh
(74) *Attorney, Agent, or Firm* — Oppedahl Patent Law Firm LLC

(57) ABSTRACT

The disclosure discloses a Software Defined Radio (SDR)-based radio communication transmission system. A front-end analog interface unit, a Digital-to-Analog (D/A) and Analog-to-Digital (A/D) conversion unit, a core processing unit and a storage unit adopt the universal bus for interconnection and interworking. The core processing unit is configured to acquire the front-end processed data from the front-end analog interface unit, and to choose to transmit the front-end processed data to the D/A and A/D conversion unit by the control of the universal bus according to whether the radio communication standard of the current data accords with the current working mode. The disclosure further discloses an SDR-based radio communication transmission method, which includes that: the core processing unit chooses to transmit the front-end processed data to the D/A and A/D conversion unit by the control of the universal bus according to whether the radio communication standard of the current data accords with the current working mode. The system and method of the disclosure can adapt to the coexistence of multiple radio communication standards and complement the advantages of each structure at the same time.

9 Claims, 1 Drawing Sheet

(56) References Cited

U.S. PATENT DOCUMENTS

| | | | |
|---|---|---|---|
| 8,218,518 B2* | 7/2012 | Pisek et al. | 370/342 |
| 2003/0038842 A1* | 2/2003 | Peck | G06F 11/263 715/763 |
| 2003/0163298 A1* | 8/2003 | Odom | G06F 9/4411 703/21 |
| 2004/0242261 A1 | 12/2004 | Fette | |
| 2005/0079890 A1 | 4/2005 | Yu | |
| 2006/0046771 A1 | 3/2006 | Tsunehara | |
| 2008/0003949 A1 | 1/2008 | Voonna | |
| 2009/0104900 A1 | 4/2009 | Lee | |
| 2009/0279699 A1* | 11/2009 | Noda | 380/259 |
| 2011/0046799 A1* | 2/2011 | Imes | F24F 11/006 700/286 |
| 2011/0078355 A1 | 3/2011 | Tan | |
| 2014/0108612 A1* | 4/2014 | Kim | G06F 1/1626 709/217 |

OTHER PUBLICATIONS

English Translation of the Written Opinion of the International Search Authority in international application No. PCT/CN2011/075015, mailed on Dec. 22, 2011.

Supplementary European Search Report in European application No. 11860928.8, mailed on Dec. 9, 2014.

* cited by examiner

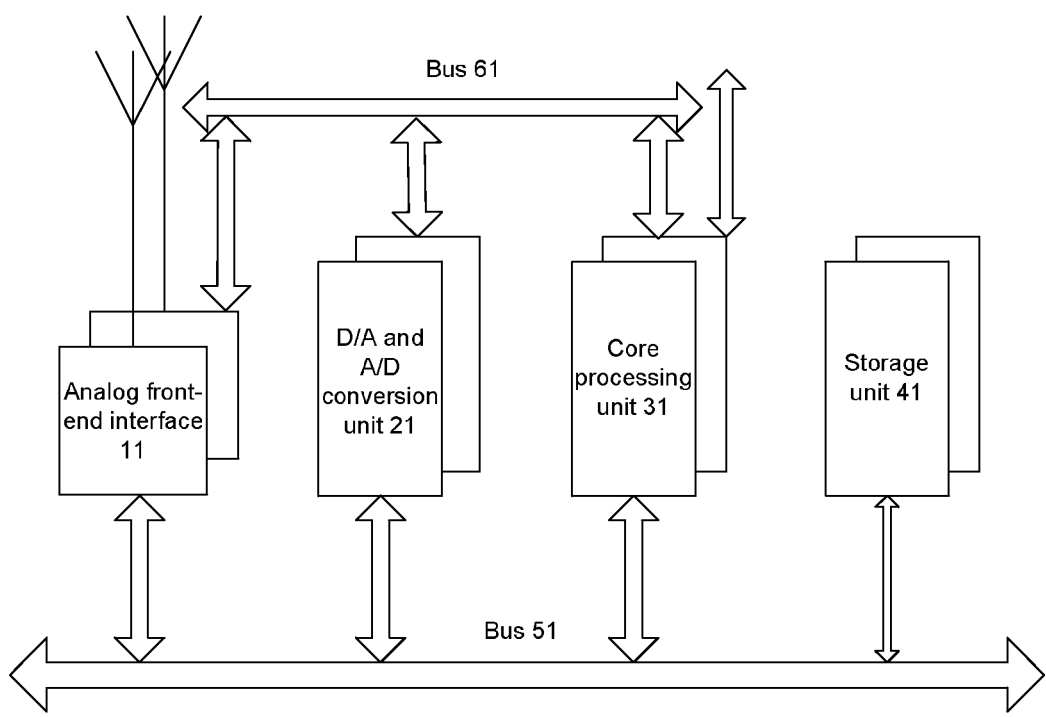

RADIO COMMUNICATION TRANSMISSION SYSTEM AND METHOD BASED ON SOFTWARE DEFINED RADIO

TECHNICAL FIELD

This disclosure relates to the field of radio mobile communication, in particular to a radio communication transmission system and method based on a Software Defined Radio (SDR) theory.

BACKGROUND

With the rapid development of the radio mobile communication technology, multiple radio communication standards arise, which include: the second-generation radio mobile communication standard of Global System for Mobile Communications (GSM) technology, the third-generation radio mobile communication standard of Code Division Multiple Access 2000 (CDMA2000) technology, Wideband Code Division Multiple Access (WCDMA) technology, Time Division Synchronous CDMA (TD-SCDMA) technology and the third-generation radio mobile communication evolution standard of Long Term Evolution (LTE) technology, as well as radio mobile communication standards of other forms, such as Bluetooth, Wireless Local Area Network (WLAN), etc.

When so many radio communication standards above coexist in a system, the multi-standard adaptability should be considered in a system design. The SDR theory is to solve such problem, and now, the transmission schemes based on the SDR and adopted to solve this problem in the prior art include: a pipeline structure, a bus-oriented structure and an interactive network structure, The pipeline structure is a structure in which each processing module is in cascaded connection with another in the radio communication system; the bus-oriented structure is a structure in which each processing module is in the bus-oriented interconnection with another in the radio communication system; and the interactive network structure is a structure in which all processing modules are interconnected and interworked through one interaction matrix. Although these structures may be adapted to the system in which the multi-standard radio communication standards coexist, the advantages of each structure cannot be complemented with each other in this case. At present, there is no solution that can help to solve such problem of complementary advantages.

SUMMARY

In view of this, the main objective of the disclosure is to provide an SDR-based radio communication transmission system and an SDR-based radio communication transmission method, so as to adapt to the coexistence of the multiple radio communication standards and to complement the advantages of each structure.

To achieve the objective above, the disclosure provides the following technical solutions.

An SDR-based radio communication transmission system is provided, which includes: a front-end analog interface unit, a Digital-to-Analog (D/A) and Analog-to-Digital (A/D) conversion unit, a core processing unit and a storage unit, which adopt a universal bus for interconnection and interworking.

The front-end analog interface unit is configured to acquire data compatible with different radio communication standards and to perform front-end processing on the data;

the D/A and A/D conversion unit is configured to perform a D/A conversion and an A/D conversion under the control of the core processing unit;

the core processing unit is configured to: acquire the front-end processed data from the front-end analog interface unit; and, according to whether the radio communication standard of the current data accords with the current working mode, choose to transmit the front-end processed data to the D/A and A/D conversion unit by the control of the universal bus, or control, through the universal bus, the storage unit to write or read data; and the storage unit is configured to store the written or read data.

Preferably, the universal bus includes a parallel bus for controlling data transmission and a serial bus for controlling instruction signal transmission.

Preferably, the front-end analog interface unit includes an antenna and a radio-frequency part and is further configured to perform the front-end processing including antenna reception, low-noise amplification, frequency mixing and filtering processing.

Preferably, the core processing unit is further configured to choose to transmit the front-end processed data to the D/A and A/D conversion unit according to whether the radio communication standard of the current data accords with the current working mode, in this case, if the data format required by the current working mode is the same as that of the front-end processed data, it is determined that the radio communication standard corresponding to the current data accords with the current working mode, then the core processing unit directly transmits the front-end processed data to the D/A and A/D conversion unit by the parallel bus, and if the data format required by the current working mode is different from that of the front-end processed data, it is determined that the radio communication standard corresponding to the current data does not accords with the current working mode, then the core processing unit stores the front-end processed data to the storage unit temporarily by the parallel bus and awaits an idle state of the current working mode for further processing.

An SDR-based radio communication transmission method is provided. A front-end analog interface unit, a D/A and A/D conversion unit, a core processing unit and a storage unit adopt the universal bus for interconnection and interworking. The method includes the following steps:

The front-end analog interface unit acquires data compatible with different radio communication standards and performs front-end processing on the data; and the core processing unit chooses to transmit the front-end processed data to the D/A and A/D conversion unit by the control of the universal bus according to whether the radio communication standard of the current data accords with the current working mode.

Preferably, the universal bus includes a parallel bus for controlling data transmission and a serial bus for controlling instruction signal transmission.

Preferably, the front-end processing includes: antenna reception, low-noise amplification, frequency mixing and filtering processing;

Preferably, the step of choosing to transmit the front-end processed data to the D/A and A/D conversion unit according to whether the radio communication standard of the current data accords with the current working mode includes:

if a data format required by the current working mode is the same as that of the front-end processed data, it is determined that the radio communication standard corresponding to the current data accords with the current working mode, then the core processing unit directly transmits the front-end processed data to the D/A and A/D conversion unit through the parallel bus; and if the data format required by the current working mode is different from that of the front-end processed data, it is determined that the radio communication standard corresponding to the current data does not accords with the current working mode, then the core processing unit stores the front-end processed data to the storage unit temporarily through the parallel bus and awaits the idle state of the current working mode for further processing.

Preferably, before the front-end processed data is transmitted to the D/A and A/D conversion unit, the method further includes: the core processing unit sends control instruction of preparing to receive data to the D/A and A/D conversion unit through the serial bus, and the D/A and A/D conversion unit receives the front-end processed data through the parallel bus after receiving the control instruction.

In the disclosure, the front-end analog interface unit, the D/A and A/D conversion unit, the core processing unit and the storage unit adopt the universal bus for interconnection and interworking; and the core processing unit is configured to acquire the front-end processed data from the front-end analog interface unit, and, according to whether the radio communication standard of the current data accords with the current working mode, choose to transmit the front-end processed data to the D/A and A/D conversion unit by the control of the universal bus, or control, through the universal bus, the storage unit to write or read data by the universal bus.

The system architecture of the disclosure is different from any single system structure, specifically, it is different from either a pipeline structure for serial processing, or a parallel bus-oriented structure for parallel processing, or an interactive network structure, or the specific bus design of the current bus-oriented architecture. The system architecture of the disclosure using the complementary advantages of these architectures, which is that the transmission of a large amount of data is implemented by the universal bus transmission for parallel processing and the transmission of a small number of real-time control signals is implemented by a pipeline for serial processing. The system architecture achieves the interconnection and interworking among modules through the universal bus, so that not only multiple radio communication standards coexist in the system compatibly, but also the evolved extension of the subsequent standard is also utilized due to the universal bus.

BRIEF DESCRIPTION OF THE DRAWINGS

FIG. 1 is a diagram of a composition structure of an embodiment system of the disclosure.

DETAILED DESCRIPTION

A basic idea of the disclosure may be that: the front-end analog interface unit, the D/A and A/D conversion unit, the core processing unit and the storage unit adopt the universal bus for interconnection and interworking; the core processing unit is configured to acquire the front-end processed data from the front-end analog interface unit, and, according to whether the radio communication standard of the current data accords with the current working mode, choose to transmit the front-end processed data to the D/A and A/D conversion unit by the control of a universal bus, or control the storage unit to write or read data by the universal bus.

The implementation of the technical solution will be further described below in conjunction with the drawings.

A SDR-based radio communication transmission system mainly includes the following components: a front-end analog interface unit, a D/A and A/D conversion unit, a core processing unit and a storage unit.

The front-end analog interface unit, the D/A and A/D conversion unit, the core processing unit and the storage unit adopt the universal bus for interconnection and interworking. The front-end analog interface unit is configured to acquire data compatible with different radio communication standards and perform the front-end processing; the D/A and A/D conversion unit is configured to perform a D/A and A/D conversion under the control of the core processing unit; the core processing unit is configured to: acquire the front-end processed data from the front-end analog interface unit, and, according to whether the radio communication standard of the current data accords with the current working mode, choose to transmit the front-end processed data to the D/A and A/D conversion unit by the control of the universal bus, or control the storage unit to write or read data by the universal bus; the storage unit is configured to store the written or read data.

Preferably, the universal bus includes a parallel bus for controlling data transmission and a serial bus for controlling instruction signal transmission.

Preferably, the front-end analog interface unit includes an antenna and a radio-frequency part and is further configured to perform the front-end processing including antenna reception, low-noise amplification, frequency mixing and filtering processing.

Preferably, the core processing unit is further configured to choose to transmit the front-end processed data to the D/A and A/D conversion unit according to whether the radio communication standard of the current data accords with the current working mode; if a data format required by the current working mode is the same as that of the front-end processed data, it is determined that the radio communication standard corresponding to the current data accords with the current working mode, then the core processing unit directly transmits the front-end processed data to the D/A and A/D conversion unit by the parallel bus; if the data format required by the current working mode is different from that of the front-end processed data, it is determined that the radio communication standard corresponding to the current data does not accord with the current working mode, then the core processing unit stores the front-end processed data to the storage unit temporarily by the parallel bus and awaits an idle state of the current working mode for further processing.

A SDR-based radio communication transmission method mainly includes the following steps:

A front-end analog interface unit, a D/A and a A/D conversion unit, a core processing unit and a storage unit adopt the universal bus for interconnection and interworking.

1. The front-end analog interface unit acquires data compatible with different radio communication standards and performs front-end processing.

2. The core processing unit chooses to transmit the front-end processed data to the D/A and A/D conversion unit by the control of the universal bus according to whether the radio communication standard of the current data accords with the current working mode.

Preferably, the universal bus includes a parallel bus for controlling data transmission and a serial bus for controlling instruction signal transmission.

Preferably, the front-end processing includes antenna reception, low-noise amplification, frequency mixing and filtering processing.

Preferably, the step of choosing to transmit the front-end processed data to the D/A and A/D conversion unit according to whether the radio communication standard of the current data accords with the current working mode includes that:

if a data format required by the current working mode is the same as that of the front-end processed data, it is determined that the radio communication standard corresponding to the current data accords with the current working mode, then the core processing unit directly transmits the front-end processed data to the D/A and A/D conversion unit through the parallel bus; and if the data format required by the current working mode is different from that of the front-end processed data, it is determined that the radio communication standard corresponding to the current data does not according with the current working mode, then the core processing unit stores the front-end processed data to the storage unit temporarily through the parallel bus and awaits an idle state of the current working mode for further processing. Here, it should be noted that such an idle state of the working mode generally happens when there are multiple communication modes, for example, when the current working mode is the GSM communication mode but a signal to be detected is in the LTE communication mode, in that case, the signal in the LTE mode cannot be processed until the current working mode (GSM mode) is idle. Such application scenario always occurs, because when the current conversation is made in the GSM mode, the system needs to detect whether the signals in other modes (such as LTE mode) have better quality at any time to prepare to switch to the mode in which the signal is the best to ensure the optimal communication quality.

Preferably, before the front-end processed data is transmitted to the D/A and A/D conversion unit, the method further includes that: the core processing unit sends a control instruction of preparing to receive data to the D/A and A/D conversion unit through the serial bus, and the D/A and A/D conversion unit receives the front-end processed data through the parallel bus after receiving the control instruction.

The disclosure is described below with examples.

A embodiment of system: FIG. 1 is a diagram of a composition structure of an embodiment system. The system in FIG. 1 includes: a front-end analog interface unit which supports multiple analog front-end interfaces 11, the analog front-end interfaces 11 further includes an antenna and a radio frequency part; a D/A and A/D conversion unit 21 including partial front-end digital processing function; a core processing unit 31 based on a SDR architecture, the core point of the SDR technology is to realize the function of hardware by using software whenever possible, which provides much convenience to modification and updating but imposes a higher requirement on the hardware architecture running the software at the same time, so a new SDR architecture scheme is provided in the disclosure to allow the software to achieve its efficiency sufficiently; and a storage unit 41 configured flexibly as required, such as expanding the capacity of the storage unit very easily; there are multiple flexible choices of a bus for the universal bus and the interconnection and interworking between each two units above are implemented through a bus 51 and a bus 61. The bus 51 and the bus 61 can be a standard bus, such as PCI. The bus 61 can also be a custom interface and can be regarded as a serial bus for controlling instruction signal transmission because it only transmits control signals, while the bus 51 can be regarded as a parallel bus for controlling data transmission and needs to adapt to various radio communication standards.

After the data is input at multiple analog front-end interfaces 11, at least the following front-end processing are performed on the data: amplification, noise removal, converting to zero intermediate frequency by down-conversion and filtering, then the data is input to the D/A and A/D conversion unit 21 through the bus 51. In the D/A and A/D conversion unit 21, D/A conversion and A/D conversion are respectively performed on the data, then the data is input into the core processing unit 31 through the bus 51. The core processing unit 31 processes the baseband data to restore the original signal and uploads through the bus 61 the original signal to a protocol stack for further processing. The control signals among the analog front-end interfaces 11, the D/A and A/D conversion unit 21 and the core processing unit 31 can be connected through the bus 61.

The original intention of the system designed based on the SDR theory is to support various radio communication standards. Various radio mobile communication standards require quite different data exchange forms (including band rate, modulation mode, bandwidth and the like) in the development process, in one aspect, various standards are required to be compatible, while in another aspect, various standards are different in requirements, thereby, so it is imperative to design a universal interface so that the reusable hardware resources can be reused as many as possible. Therefore, the interconnection and interworking among the D/A and A/D conversion unit 21, the core processing unit 31 and the storage unit 41 may be implemented through a standard universal bus (bus 51 and bus 61). The antenna and radio frequency part of the analog front-end interface 11 are rarely reused, so the analog front-end interface 11 can be designed specifically in order to be compatible with various radio communication standards, i.e., a specific analog front-end interface is designed respectively for each of the radio communication standards.

The specific process of transmitting data flow implemented by the interconnection and interworking of each of units in the embodiment system above through the universal bus includes the following steps:

1. Firstly, the analog front-end interface 11 acquires data at the frequency band to be detected (the detected frequency band is different according to the specific compatible radio communication standard) and then performs front-end processing on the data, the front-end processing includes antenna reception, low-noise amplification, frequency mixing and filtering processing.

2. After the front-end processing is performed on the data, choosing how to further processing the data according to the current working mode of the system: if the data format required by the current working mode of the system is that of the current processed data or the data required by the current working mode of the system is the current processed data, it is determined that the radio communication standard corresponding to the current data accords with the current working mode, then the core processing unit 31 directly outputs through the control bus 51 the current processed data to the D/A and A/D conversion unit 21 for further processing; and if the data format required by the current working mode of the system is not that of the current processed data or the data required by the current working mode of the system is not the current processed data, it is determined that the radio communication standard corresponding to the current data does not accords with the current working mode, then the core processing unit 31 temporarily stores the current processed data to the storage unit 41 by controlling the universal control bus 61 and awaits the idle state of the current working mode for further processing.

3. After the data to be processed is written into the D/A and A/D conversion unit 21 by the core processing unit 31, the D/A and A/D conversion unit 21 processes the data under the control of the core processing unit 31 and the processed data is output to the core processing unit 31 or the storage unit 41 according to the type of the processed data. For example, the core processing unit 31 sends a control instruction of preparing to receive data to the D/A and A/D conversion unit 21 through the universal control bus 61, the D/A and A/D conversion unit 21 receives the data through the bus 51 and processes it after receiving the instruction, and the processed data is stored to the core processing unit 31 or the storage unit 41 according to the storage instruction sent by the core processing unit 31 through the universal control bus 61.

4. The core processing unit 31 is the core of the whole architecture and controls the normal operation of the system through a standard universal bus (the bus 51 and the bus 61). The bus 51 and the bus 61 are standard bus, such as PCI, which can be chosen according to the specific application. For example, an AXI bus can be adopted in the application requiring a high rate and an AMBA bus can be adopted in the application not requiring a high rate.

5. The storage unit 41 writes or reads data under the control of the core processing unit 31.

Here, it should be noted that only the design of the core system architecture for stream data transmission is emphasized in the disclosure, so the designs of other interfaces are excluded.

To sum up, the radio communication system architecture based on the SDR theory is constructed based on the universal bus in the disclosure. In one aspect, the structure based on Personal Computer (PC) and LAN is novel in design and simple and practical in architecture; in another aspect, it is suitable for the radio base station based on the SDR technology and can expand the radio frequency interface and the D/A and A/D conversion interface flexibly, which satisfies the requirements of multiple frequency points and high bandwidth of the SDR technology. Because the architectures of the PC and LAN are general system architectures widely adopted at present, which are simple in hardware structure and high in software running efficiency, the interconnected architecture form implemented by the standard universal bus (bus 51 and bus 61) in the disclosure embodies the advantages of the architectures of the PC and LAN and a high efficiency of the software can also be achieved by the bus 51 and the bus 61. Meanwhile, due to the requirements of multiple frequency points and high bandwidth of the SDR technology, the analog front-end interface 11, the D/A and A/D conversion unit 21, the core processing unit 31 and the storage unit 41 in the disclosure are interconnected through a universal interface rather than a specific interface. The universal interface is good in high universality and compatibility and can be compatible with a new frequency point and a higher bandwidth well when an SDR base station requires more frequency points and a higher bandwidth.

What described above are only the preferred embodiments of the disclosure, and not intended to limit the scope of protection of the disclosure.

The invention claimed is:

1. A Software Defined Radio (SDR)-based radio communication transmission system, comprising a front-end analog interface unit, a Digital-to-Analog (D/A) and Analog-to-Digital (A/D) conversion unit, a core processing unit and a storage unit, which adopt a universal bus for interconnection and interworking, the universal bus comprising a parallel bus for controlling data transmission and a serial bus for controlling instruction signal transmission, wherein the front-end analog interface unit is configured to acquire data compatible with different radio communication standards, and to perform front-end processing on the data;

the D/A and A/D conversion unit is configured to perform a D/A conversion and an A/D conversion under the control of the core processing unit;

the core processing unit is configured to: acquire the front-end processed data from the front-end analog interface unit; and, compare a data format required by the current working mode with that of the front-end processed data, and then, according to a result of the comparison, choose to transmit the front-end processed data to the D/A and A/D conversion unit by the control of the universal bus, or control, through the universal bus, the storage unit to write or read data; and the storage unit is configured to store the written or read data.

2. The system according to claim 1, wherein the front-end analog interface unit comprises an antenna and a radio-frequency part and is further configured to perform the front-end processing comprising antenna reception, low-noise amplification, frequency mixing and filtering processing.

3. The system according to claim 1, wherein the core processing unit is further configured to:

if the result of the comparison is that the data format required by the current working mode is the same as that of the front-end processed data, it is determined that the radio communication standard of the data accords with the current working mode, directly transmit the front-end processed data to the D/A and A/D conversion unit through the parallel bus; and if the result of the comparison is that the data format required by the current working mode is different from that of the front-end processed data, it is determined that the radio communication standard of the data does not accord with the current working mode, store the front-end processed data to the storage unit temporarily through the parallel bus and await an idle state of the current working mode for further processing.

4. The system according to claim 1, wherein the front-end analog interface unit comprises an antenna and a radio-frequency part and is further configured to perform the front-end processing comprising antenna reception, low-noise amplification, frequency mixing and filtering processing.

5. A Software Defined Radio (SDR)-based radio communication transmission method, wherein a front-end analog interface unit, a Digital-to-Analog (D/A) and Analog-to-Digital (ND) conversion unit, a core processing unit and a storage unit adopt a universal bus for interconnection and interworking, universal bus comprising a parallel bus for controlling data transmission and a serial bus for controlling instruction signal transmission, and the method comprising:

acquiring, by the front-end analog interface unit, data compatible with different radio communication standards, and performing front-end processing on the data; and comparing, by the core processing unit, a data format required by the current working mode with that of the front-end processed data, and then, according to a result of the comparison, choosing to transmit the front-end processed data to the D/A and A/D conversion unit by the core processing unit under the control of the universal bus.

6. The method according to claim 5, wherein the front-end processing comprises: antenna reception, low-noise amplification, frequency mixing and filtering processing.

7. The method according to claim 5, wherein the step of comparing a data format required by the current working mode with that of the front-end processed data by the core processing unit, and then, according to a result of the comparison, choosing to transmit the front-end processed data to the D/A and A/D conversion unit comprises:
- if the result of the comparison is that the data format required by the current working mode is the same as that of the front-end processed data, it is determined that the radio communication standard of the data accords with the current working mode, then the core processing unit directly transmitting the front-end processed data to the D/A and A/D conversion unit through the parallel bus; and
- if the result of the comparison is that the data format required by the current working mode is different from that of the front-end processed data, it is determined that the radio communication standard of the data does not accord with the current working mode, then the core processing unit storing the front-end processed data to the storage unit temporarily through the parallel bus and awaiting an idle state of the current working mode for further processing.

8. The method according to claim 7, further comprising the step, before the front-end processed data is transmitted to the D/A and A/D conversion unit, of:
- sending, by the core processing unit, the D/A and A/D conversion unit through the serial bus a control instruction of preparing to receive data; and
- receiving, by the D/A and A/D conversion unit, the front-end processed data through the parallel bus after receiving the control instruction.

9. The method according to claim 5, wherein the front-end processing comprises: antenna reception, low-noise amplification, frequency mixing and filtering processing.

\* \* \* \* \*